(12) United States Patent
Brown

(10) Patent No.: US 7,005,102 B2
(45) Date of Patent: Feb. 28, 2006

(54) MANUFACTURING PROCESS GENERATING A PROCESS AIRFLOW WHICH MAINTAINS AUTO FIRE FOR A REGENERATIVE THERMAL OXIDIZER

(75) Inventor: Charles M. Brown, Wayzata, MN (US)

(73) Assignee: Aqua Glass Corporation, Adamsville, TN (US)

(*) Notice: Subject to any disclaimer, the term of this patent is extended or adjusted under 35 U.S.C. 154(b) by 566 days.

(21) Appl. No.: 10/214,516

(22) Filed: Aug. 8, 2002

(65) Prior Publication Data

US 2003/0206836 A1 Nov. 6, 2003

Related U.S. Application Data

(63) Continuation-in-part of application No. 10/146,275, filed on May 15, 2002, and a continuation-in-part of application No. 10/136,171, filed on May 1, 2002, now Pat. No. 6,929,767.

(51) Int. Cl.
*B28B 5/00* (2006.01)
*B05C 11/00* (2006.01)

(52) U.S. Cl. .............................. 264/297.7; 264/297.8; 118/663

(58) Field of Classification Search ............... 422/168; 431/1, 5; 264/297; 425/453
See application file for complete search history.

(56) References Cited

U.S. PATENT DOCUMENTS

| | | | |
|---|---|---|---|
| 3,431,596 A | 3/1969 | Rodrigues et al. | |
| 3,466,700 A | 9/1969 | Harrison | |
| 3,506,755 A | 4/1970 | Rudder et al. | |
| 3,545,039 A | 12/1970 | Duckett | |
| 3,810,731 A | 5/1974 | Anderson | |
| 3,898,027 A | 8/1975 | Milner | |
| 4,075,301 A | 2/1978 | Oswald | |
| 4,102,964 A | 7/1978 | Ridgeway | |
| 4,105,734 A | 8/1978 | Nakagawa | |
| 4,363,687 A | 12/1982 | Anderson | |
| 4,568,604 A | 2/1986 | Kurtz et al. | |
| 4,687,531 A | 8/1987 | Potoczky | |
| 4,751,029 A | 6/1988 | Swanson | |
| 5,342,565 A | 8/1994 | Goren | |
| 5,591,464 A | 1/1997 | Renzo | |
| 5,654,017 A | 8/1997 | Harmsen | |
| 6,086,813 A | 7/2000 | Gruenwald | |

OTHER PUBLICATIONS

Jurinsky, J.B., "Relationships between capture of vapor emissions and occupational exposures for open molding of reinforced plastic composites" Composites Fabricators Association, Online, Aug. 10, 2001, XP002244271.*
Durr Environmental, Inc., Standard Products for VOC, HAP and Odor Control.
Durr Environmental, Inc., NOx Abatement.
Reeco. RE-Therm RL Regenerative Thermal Oxidizers & Regenerative Catalytic Oxidizers.

* cited by examiner

*Primary Examiner*—Glenn Caldarola
*Assistant Examiner*—Tom P. Duong
(74) *Attorney, Agent, or Firm*—Carlson, Gaskey & Olds

(57) ABSTRACT

A mold manufacturing system includes confining environmentally controlled applying operations to but a few area or a single area. The process airflow generated therefrom includes a substantially constant low flow with a high concentration of HAPs which maintains an auto-fired oxidizer system to provide more efficient and less expensive operation thereof.

16 Claims, 7 Drawing Sheets

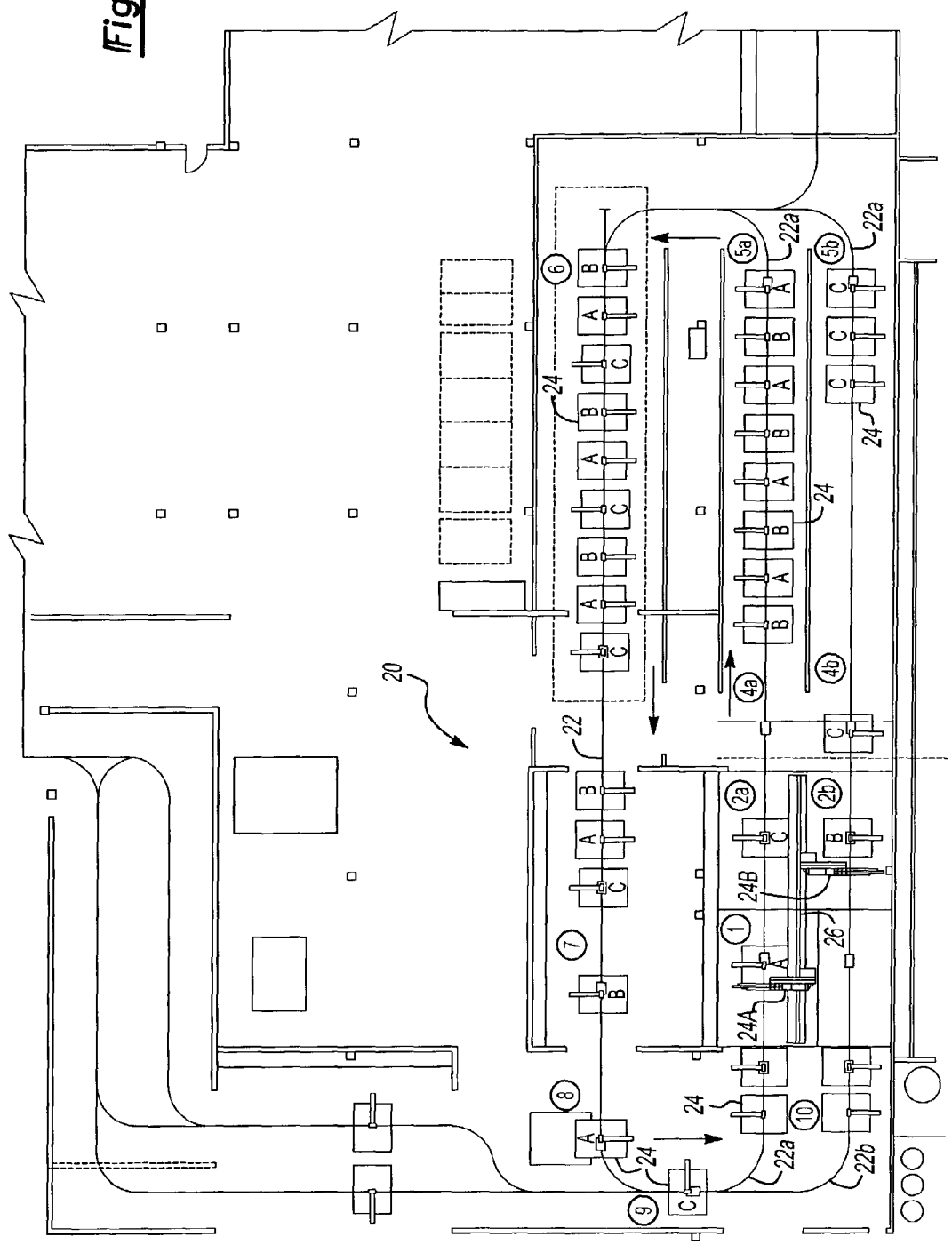

| | Inside Spray Booth | | | | | | Outside Spray Booth | | | |
|---|---|---|---|---|---|---|---|---|---|---|
| Mold Lap | Zone 1 | Zone 2 | Lap | Zone 4 | Zone 5a/5b | Zone 6 | Zone 7 | Zone 8 | Zone 9 | Zone 10 |
| Lap 1 "A" | Gelcoat | | To lap B | Queue (4a) | Cure | Cure/ Queue | No stop req'd. | De-mold finished "c" lap part -- one minute. | | Wipe -- two min total |
| Lap 2 "B" | | First Chop Coat Spray | To lap C | Queue (4b) Roll; Trim | Cure | Cure/ Queue | Rotate; Flip and Chop; Barrier Coat -- two min. total. | No stop req'd. | No stop req'd. | No stop req'd. |
| Lap 1 "C" | | Cover Coat Spray | To lap A | Queue (4a) | Cure | Cure/ Queue | Foam; Base; Rotate -- one min. total | No stop req'd. | No stop req'd. | No stop req'd. |

*Fig-2*

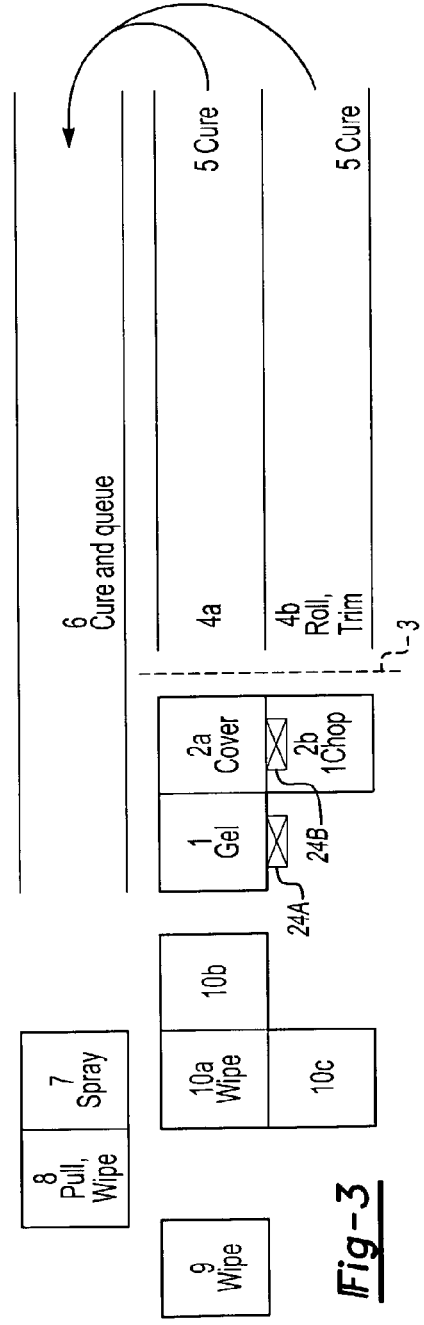

*Fig-3*

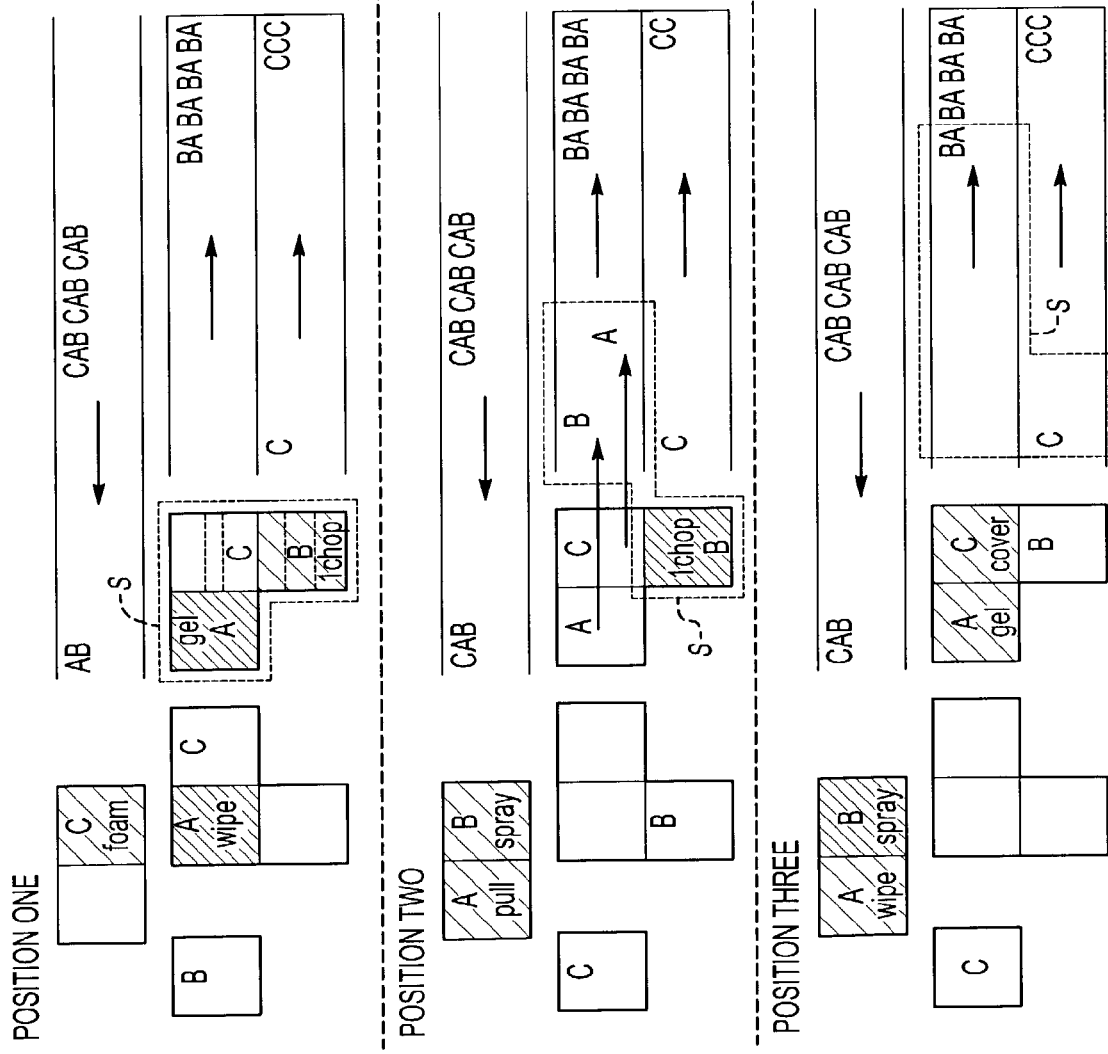

| | ZONE | | | | | | | | | | TOTAL |
|---|---|---|---|---|---|---|---|---|---|---|---|
| | 1 | 2 | 3 | 4 | 5 | 6 | 7 | 8 | 9 | 10 | |
| OPERATION | GEL COAT | CURE | BARRIER COAT, FLIP AND CHOP BOWL | CURE | ONE CHOP | APPLY BASE, ROLL, TRIM, CURE | FOAM, COVER COAT | CURE | PULL | WIPE | |
| MINUTES REQUIRED | 3 | 24 | 3 | 6 | 3 | 24 | 3 | 18 | 1 | 5 | 90 |

MANUFACTURING PROCESS GENERATING A PROCESS AIRFLOW WHICH MAINTAINS AUTO FIRE FOR A REGENERATIVE THERMAL OXIDIZER

BACKGROUND OF THE INVENTION

The present application is a continuation-in-part of U.S. patent application Ser. No. 10/146,275, filed May 15, 2002 and U. S. patent application Ser. No. 10/136,171, filed May 1, 2002 now U.S. Pat. No. 6,929,767.

The present invention relates to an open mold manufacturing process, and more particularly to a manufacturing process which generates a process airflow which maintains auto fire in a regenerative thermal oxidizer.

Open mold fiberglass reinforced plastic molding systems are well known. Molds travel once along an assembly line. A plurality of operations are performed at stations along the assembly line until a finished part is removed from the mold at the end of the assembly line.

Multiple stations along the assembly line are spray stations. As the molds transit the spray station a particular spraying operation is performed. Such spray operations include gelcoat and resin/catalyst/chopped fiberglass fixture application. Multiple coats are often required for one or more spraying operations necessitating additional spray stations. Stringent environmental regulations apply to these spraying operations as the sprayed material involves several chemical reactions. Conventional spray stations provide an open environment in which an airflow is directed from behind a spray operator to direct mold overspray into an exhaust port.

Environmental regulations are becoming more and more inflexible. The expense of providing environmental emission control devices which meet environmental regulations often results in cost prohibitive manufacturing facilities. Often older facilities become non-compliant and must be idled. The expense of the regulation may be particularly high for an assembly line type molding system as spraying occurs at multiple locations along the assembly line. The entire facility is therefore typically subjected to particularly harsh environmental regulations.

Assembly line type molding systems require a rather large manufacturing facility footprint as a curing station typically follows each spraying station. The sequential nature of the assembly line environment provides for constant movement of the molds. The curing stations must be of a length to assure proper curing of the prior spray operation. Multiple lengthy curing stations greatly lengthens the assembly line. A larger manufacturing facility is subject to harsher environmental regulations than a smaller facility.

The sequential nature of the assembly line environment provides multiple spray stations spaced along its length. Each spray station is vulnerable to many exogenous variables that are difficult to control in a cost effective manner. Control of these variables is only magnified in larger manufacturing facilities.

Typically, human operators at each spray station are highly trained to minimize volatility in the manufacturing process. Many individual operators, even though highly trained, still may create manufacturing process volatilities due to variance in human technique and process manipulation. Robotic sprayers are often provided in place of operators to increase spraying consistency. However, this may simply result in many robotic spray stations replacing many human spray stations without a substantial reduction in expense.

Moreover, conventional molding systems provide a low concentration of heat producing HAPs (Hazardous Air Pollutants) and VOC's (Volatile Organic Compounds) in combination within rather high process airflow. Due to the low concentration high airflow, auto fire within the environmental control system is not readily achieved. Auxiliary fuel gas such as natural gas must be added to the process airflow to supplement the air pollutant concentrations such that operational temperature for the environmental burner system is maintained. The requirement for auxiliary fuel gas decreases efficiency and increases process costs.

Accordingly, it is desirable to provide an open mold manufacturing process which meets stringent environmental regulations within a small footprint facility. It is further desirable to minimize manufacturing process volatilities due to exogenous and human variables in a cost effective manner. It is still further desirable to generate a process airflow which maintains auto fire in environmental burner system.

SUMMARY OF THE INVENTION

The mold manufacturing systems according to the present invention is utilized for open molding of large parts, and in particular bath tubs and shower surrounds. The environmentally controlled applying operations are concentrated to but a few areas or a single area such that the process airflow generated therefrom includes a substantially constant low flow with a high concentration of HAPs and VOCs which maintain auto-fire for an oxidizer such as a Regenerative Thermal Oxidizer (RTO) system to provide more efficient and less expensive operation thereof The majority of the heat energy produced by the RTO is redirected for reuse in treating the process aiflow containing HAPs and VOCs from process exhausts. The mold manufacturing systems of the present invention provides a process airflow which includes a concentration of air pollutants which maintain auto-fire within the RTO. "Auto-fire" defined herein is utilized to describe operation of the RTO without usage of the heretofore requirement for auxiliary fuel gas such as natural gas which supplements the air pollutants to assure proper operational temperature for the RTO.

The present invention therefore provides an open mold manufacturing system which meets stringent environmental regulations within a small footprint facility while maintaining auto fire within the RTO.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general floor plan view a multi-lap mold manufacturing system designed according to the present invention;

FIG. 2 is a chart diagramming spray operations relative to lap and Zone;

FIG. 3 is a block diagram schematically illustrating the multi-lap mold manufacturing system of FIG. 1;

FIG. 4C is the block diagram of FIG. 3 illustrating the set of molds in a third three positions;

DETAILED DESCRIPTION OF THE PREFERRED EMBODIMENT

Figure 4A:
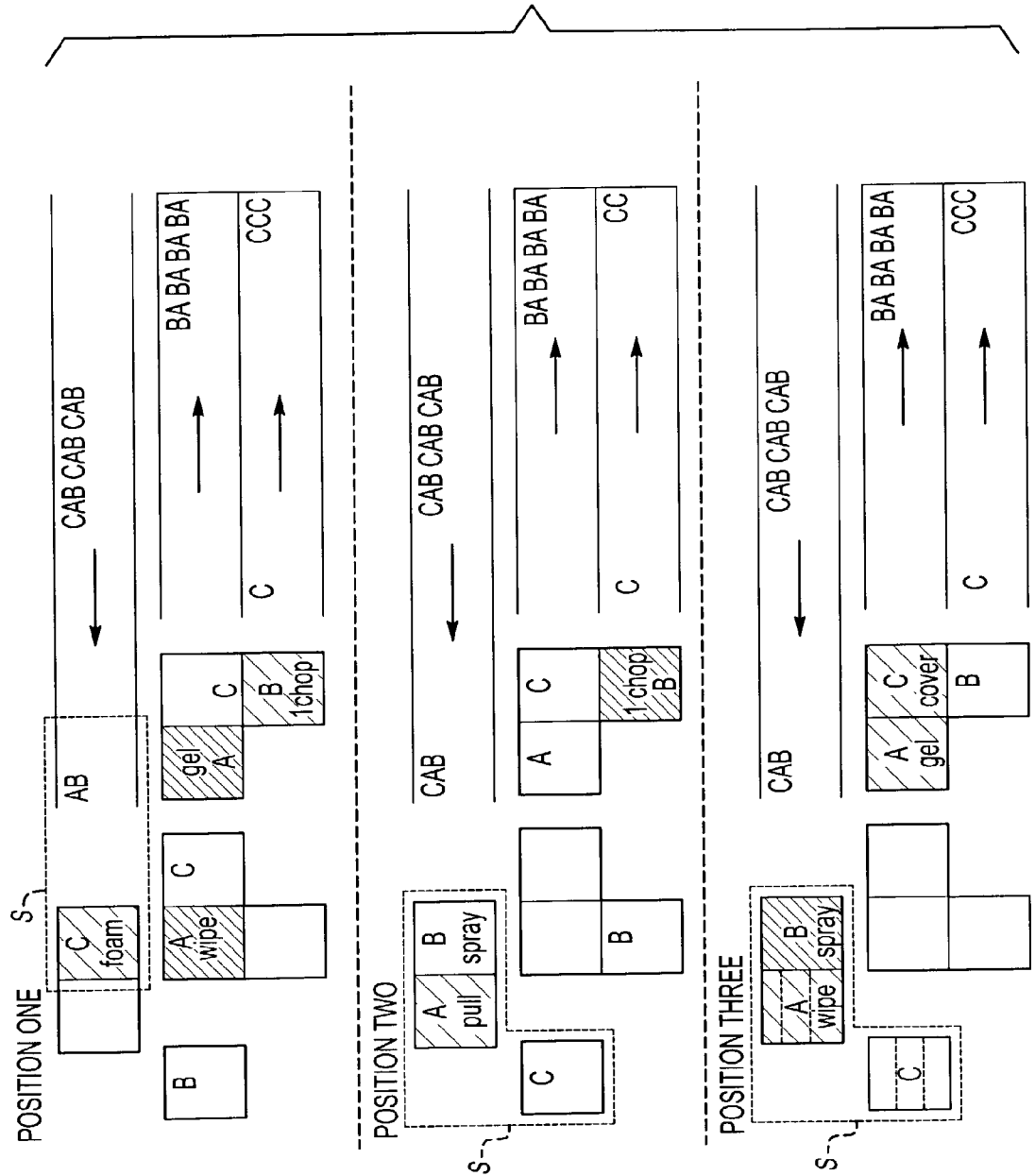
FIG. 4A is the block diagram of FIG. 3 illustrating a set of molds in a first three positions.

FIG. 1 illustrates a factory layout for a multi-lap mold manufacturing system 20. System 20 is preferably utilized for open molding of large parts, and in particular bath tubs and shower surrounds. The system 20 includes an overhead rail circuit 22 upon which a multiple of molds 24 transit a closed loop. The molds 24 hang from the rail system such that access is readily provided to the entire mold outer surface. It should be understood that other transit systems such as tracks, guided vehicles and the like will also benefit from the present invention.

The system 20 is separated into Zones in which a particular mold operation is performed depending upon which lap the mold 24 is presently on (also illustrated by the circuit map of FIG. 3 and the lap matrix of FIG. 2). The Zones may also be considered replaceable modules such that the present invention is not limited to just the defined number and operations, but may be tailored by the addition, subtraction and/or replacement of modules in which other operations are performed. The mold lap is designated by letters A–C, in which letter A designates that the mold is on the first lap; letter B designates that the mold is on the second lap; and letter C designates the mold is on its third and final lap. Preferably, the molds 22 travel through the system 20 in sets of three and in the order CAB. It should be understood that although three laps and sets of three molds 24 are discussed in the described embodiment, any number of laps and mold sets will benefit from the present invention.

Referring to FIGS. 2 and 3, the system 20 is schematically illustrated as separated in Zones by operation. Zone 1 is a spray Zone in which the mold 22 is sprayed with a layer of resin referred herein as "gelcoat". The gelcoat, as generally known, is a hardenable resin that becomes the visible surface of the finished product. It should be understood that although described as a "spray" other methods of application, such as dipping, swabbing, e-coating, or the like will also benefit form the present invention. The application processes for these materials are defined herein as environmentally controlled applying operations which are subject to certain government regulations.

Zone 1 is a spray booth station in which a spray robot (illustrated schematically at 24A in FIG. 1) moves along and traverses relative a rail mount 26. Zone 2 is also a spray Zone which is separated into a first spray Zone 2a and a second spray Zone 2b. Zone 2b is a spray Zone in which the mold 22 is sprayed with a first layer of resin/catalyst/chopped fiberglass mixture referred herein as "first chop". Zone 2a is a spray Zone in which the mold 22 is sprayed with a second layer of the resin/catalyst/chopped fiberglass mixture referred herein as "cover". A second spray robot 24B is also located within Zone 2 and preferably moves along rail mount 26. The second robot 24B preferably traverses between Zone 2a and Zone 2b such that robot 24B utilization is one hundred 100 percent. That is, robot 24B is never idle when the molding system 20 is operational as it is alternatively spraying the same mixture into Zones 2a and 2b.

Concentrated spraying occurs in Zones 1, 2a, and 2b. The high concentration of spraying and the associated low airflow requirements provides for more effective utilization of expensive environmental emission control devices. Moreover, as the same spray Zones 1, 2a, and 2b are used repeatedly on each lap, a large number of spray operations are replaced by a small number of spray Zones. That is, a large number of spray operations (higher airflow lower spraying concentration) along a conventional assembly line type molding system are replaced by spray Zones 1, 2a and 2b which are utilized on each mold lap. Application of exceedingly expensive environmental emission control devices is therefore at least partially mitigated by the reduced number of concentrated spray stations, the associated low airflow requirements to effectively remove the emissions and the much smaller factory footprint.

Figure 5:
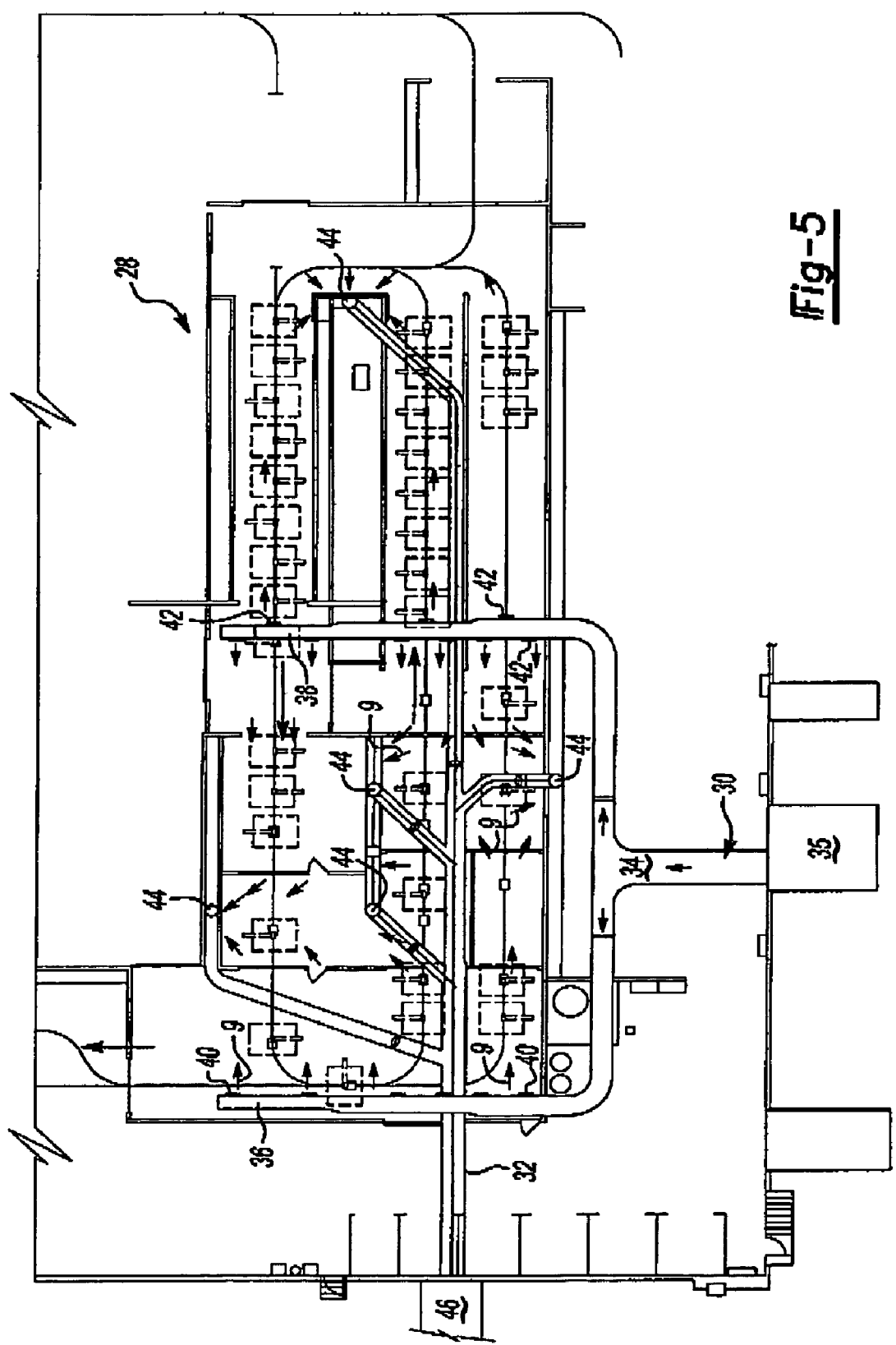
FIG. 5 is a general floor plan view a multi-lap mold manufacturing system of FIG. 1 illustrating an air flow system therefore.

Preferably, the present invention utilizes an exhaust port at Zone 1, an exhaust port for each of Zones 2a, and 2b, and one or more exhaust ports for the remainder of the facility (FIG. 5). It should be understood that although a particular exhaust port arrangement is discussed in the described embodiment, any number of ports will benefit from the present invention. The present invention, however, provides a reduction of exhaust ports (FIG. 5) which receive a higher concentration of chemicals than heretofore conventional molding facilities.

Consolidation of multiple spray operations into a few spray Zones also advantageously simplifies the control of chemical and ambient variables which improves production efficiencies. It should be understood that although robots are preferred for Zones 1, 2a, and 2b, operators in proper protective equipment may additionally or alternatively be located in the spray Zones. In addition, the consolidation of spray operations minimizes the requirement for more highly skilled labor to the spray Zones or the required number of robots.

Zones 4–10 are mold operations which require minimal or low-concentration spraying and relatively uncomplicated manual tasks. Zone 7, for instance, is not utilized on each lap. As further described below, a common exhaust port is typically adequate for these Zones. Preferably, an exhaust port is located in Zone 5 and between Zones 5A and 6 (FIG. 5).

Zones 7–10 require minimum mold 24 stops. Zone 7 provides for a relatively light barrier coat spray and foam coat spray operation in combination with mold manipulation to provide for effective gravity-assisted spraying operations. The Zone 7 spray operations, in contrast to those in Zones 1, 2a, and 2b, occur within a spray booth having a system-wide exhaust port rather than a dedicated exhaust port.

Zone 8 is where a completed part is removed or "pulled" from the mold 22, i.e., demolded after it has completed lap C. Zones 8–10a is where the bare mold is wiped down and cleaned after demolding. It should be understood that these operations may be performed by robots and/or human workers. Moreover, these Zones may incorporate both automated and human performed operations.

Zone 10a provides for continued wiping while Zones 10b and 10c (FIG. 1) also operate as a staging area for molds 22 which are waiting to move into the spray Zones 1, 2a, and 2b. The molds 24 are also separated by lap in Zone 10. Molds which are on lap A and C are staged along rail leg 22a (FIG. 1) for Zone 1 and 2a while molds on lap B are staged along rail leg 22b (FIG. 1) for Zone 2b. Preferably, molds travel to Zones 1 and 2 in a down minute of the robot so full time is available for spraying.

Zones 4a, 4b, 5a, 5b and 6 are primarily queues in which the previous spray operations are cured. The system 20 footprint is further reduced as the curing Zones 4a, 4b, 5a, 5b and 6 are integrated within the rail circuit 22, i.e., a separate curing area need not be sequentially located after each spraying operation along an assembly line.

Zones 4a/5a queue the molds on laps A and B in a BABABABA arrangement while Zones 4b/5b queue only the molds on lap C (FIG. 1). Notably, between Zone 2 and Zone 4 is an arbitrary line (designated Zone 3) where a lap is completed and the lap designation is increased by one as will be further described. Two molds 22 leave Zones 4a/5a only after one mold leaves Zones 4b/5b such that molds within Zone 6 are always sequenced in sets of three in a CAB order (FIG. 1).

Figure 4B:
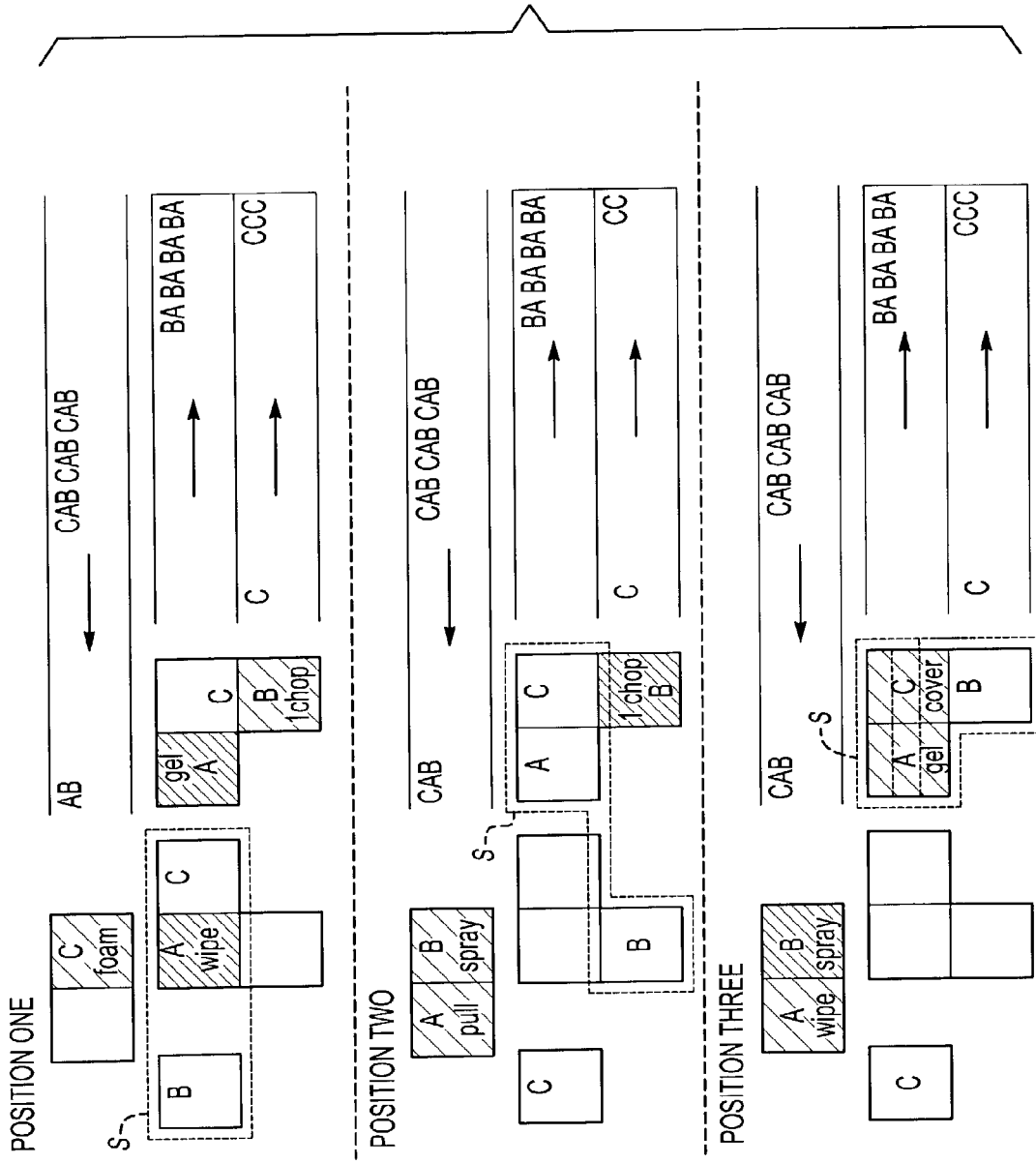
FIG. 4B is the block diagram of FIG. 3 illustrating the set of molds in a second three positions.

With reference to FIGS. 4A–4C, movement of one set S of three molds (each on a different lap) will be described to illustrate operation of the system 20. As mentioned, the molds 24 are staged in Zone 6 in the CABCABCAB order. Molds 24 within Zones 4a, 4b, 5a, 5b move from left to right in FIGS. 4A–4C which molds within Zone 6 move from right to left.

Referring to FIG. 4A, there are three positions for the system 20. Each position represents the same amount of time which, preferably, is approximately one minute. The three positions continue to rotate through positions: POSITION ONE, POSITION TWO, POSITION THREE; POSITION ONE, POSITION TWO, POSITION THREE; etc. That is, the molds are always rotating through the system 20. It should also be understood that mold set S has been selected for descriptive reasons and the set S may have been described with referenced to any beginning position.

It should be further understood that start-up and shut-down of the system 20 occurs in a staged manner. That is, only ⅓ of the molds are processed during the A lap alone. A second ⅓ of the molds begin processing on the A lap—now the original ⅓ are on the B lap. Finally, the last ⅓ begin processing on the A lap—now the original ⅓ are on the C lap; and the second ⅓ are on the B lap. Labor may therefore be added and removed from the system 20 in a staged manner to further decrease expense.

Beginning with a mold set S (illustrated within phantom line) in POSITION ONE, the first mold 24 of the set S is on lap C and is within Zone 7 (FIG. 3) while the following two molds 24 are on lap A and lap B within Zone 6. The mold 24 which is depicted as on lap A actually retains a completed product. In other words, the mold, although designated as being on lap A, actually contains a finished part which has cured in Zone 5/6.

At POSITION ONE, the lap C mold undergoes a foam spray operation (FIG. 2) for one minute within Zone 7. Schematically, the box is hatched as the mold is undergoing the first minute of the task. Also identified schematically, the lap designator C is in the top of the box to indicate that the mold spends the first minute in Zone 7.

At POSITION TWO, the C mold has moved to Zone 9, the A mold has moved into Zone 8, and the B mold has moved to Zone 7. The C mold is simply passing through Zone 9 as no operation is performed (FIG. 2). As described above, the A mold has the finished part removed such that the mold 24 is set to start the entire process again. Schematically, the Zone 8 box is hatched as the mold is undergoing the first minute of the task. The B mold has moved into Zone 7. The B mold undergoes the first minute of manipulation and barrier coat spray (FIG. 2). Schematically, the Zone 7 box is hatched as the mold is undergoing the first minute of the task.

At POSITION THREE, the C mold, A mold, and the B mold remain in the same Zones. As the C mold, A mold, and the B mold remain in the same Zone as POSITION TWO, the lap designators schematically move to the central portion of their respective box to indicate that the molds are spending their second minute in the same Zone. The C mold still has no operation performed (FIG. 2). The A mold is now wiped down in the second minute at Zone 8, however this is the first minute of the wipe operation. Schematically, the Zone 8 box is hatched as the mold is undergoing the first minute of the wipe operation. The B mold remains in Zone 7 while the second minute of the two minute long task (FIG. 2) is completed. Schematically, the Zone 8 box is shaded as the mold is undergoing the second minute of the barrier coat operation (FIG. 2).

Referring to FIG. 4B POSITION ONE, the C mold has moved to Zone 10b, the A mold has moved into Zone 10a, and the B mold has moved to Zone 9. As the C mold, A mold, and the B mold move to new Zones, the lap designators schematically move to the top portion of their respective box to indicate that the molds are spending their first minute in their respective Zones. Schematically, the Zone 10a box is shaded as the A mold is undergoing the second minute of the wipe operation (FIG. 2). The molds are being staged in Zone 10 (FIG. 1) prior to entering the spray Zones.

At POSITION TWO, the C mold has moved to Zone 2a, the A mold has moved into Zone 1, and the B mold has moved to Zone 10c. No operations are performed. As the C, A and B mold move to new Zones, the lap designators schematically move to the top portion of their respective box to indicate that the molds are spending their first minute in their respective Zones. It should be noted, however, that when the molds reach staging Zone 10, the A mold and C mold are staged along rail 22a (FIG. 1) for Zones 1 and 2a, respectively, while the B mold is staged along rail leg 22b (FIG. 1) for Zone 2b.

At POSITION THREE, the C mold and the A mold remain in the same Zones. As the C mold and A mold remain in the same Zone as POSITION TWO, the lap designators schematically move to the central portion of their respective box to indicate that the molds are spending their second minute in the same Zone. The B mold moves into Zone 2b and the lap designator is schematically moved to the top of the Zone 2b box to indicate that the B molds is spending its first minute in the 2b. Schematically, the Zone 2a box and Zone 1 box is hatched as the respective C mold and A mold are undergoing the first minute of the spray operation. Specifically, the C mold is undergoing the first minute of the cover coat spray by robot 24B, while the A mold is undergoing the first minute of the gelcoat spray by robot 24A.

Referring to FIG. 4C POSITION ONE, the C mold, A mold, and the B mold remain in the same Zones. As the C mold and A mold remain for a third minute in the same Zone, the lap designators schematically move to the bottom portion of their respective box to indicate that the molds are spending their third minute in the same Zone. As the B mold remains for a second minute in the same Zone, the B lap designator schematically moves to the central portion of its box to indicate that the mold is spending its second minute in the same Zone.

Schematically, the Zone 1 box is shaded as the A mold is undergoing the second minute of the gelcoat spray by robot 24A. No operation is performed on the C mold.

Schematically, the Zone 2b box is hatched as the B mold is undergoing the first minute of the chop spraying operation. That is, robot 24B (FIG. 1) pivots away from the C mold to provide the first minute of chop coat spray to mold B. Further, if the cover coat spray by robot 24B is completed early, robot 24B can immediately thereafter pivot to begin the chop coat spray to mold B.

Referring to FIG. 4C POSITION TWO, lap operations for the C mold and A mold are complete. The C mold and A mold, having completed their operations are schematically changed to an A mold and a B mold lap designation and move into staging area 4a. As discussed above, the C mold is designated as an A mold but the finished part must cure through Zone 6 until it is finally removed at Zone 8 (FIG. 4A, POSITION TWO). The A mold becomes a B mold and travels two more laps around the system 20. The lap indicator of the B mold within Zone 2b schematically moves to the bottom of the Zone 2b box to indicate that it is spending the third minute at Zone 2b. Schematically, the Zone 2b box is shaded as the B mold is undergoing the second minute of the chop operation (FIG. 2).

Referring to FIG. 4C POSITION THREE, lap operations for the B mold is complete. The B mold, having completed its operation is schematically changed to a C mold lap designation and moves into staging area 4b where a rolling and trimming operation are performed. The B mold is now a C mold which travels one more lap around the system 20.

Three parts come out of the spray Zones 1, 2a, and 2b every three minutes so one part is pulled every three minutes when thirty molds are traversing the system 20. Total cycle time is approximately ninety minutes per molded part using known chemistry.

Referring to FIG. 5, an airflow system 28 for the system 20 is schematically illustrated. The airflow system 28 includes an induction system 30 and an exhaust system 32. The induction system 30 preferably provides a primary blower duct 34 which communicates airflow from a blower 35 or the like. The primary blower duct 34 splits into a first and second secondary duct 36, 38. The first and second secondary ducts 36,38 are preferably arranged in a substantially U-shape.

The first secondary duct 36 is arranged substantially perpendicular to Zones 8, 9 and 10. A plurality of blower ports 40 extend from the first secondary duct 36 to direct airflow (illustrated schematically by arrows a) toward the center of the system 20. The majority of Hazardous Air Pollutants (HAPs) producing operations are preferably located between the first and second secondary duct 36, 38.

The second secondary duct 38 is arranged substantially perpendicular to and between Zones 7, 2A, 2B and Zones 6, 4a and 4b. A plurality of blower ports 42 extend from the second secondary duct 38 to direct airflow (illustrated schematically by arrows a) toward the first secondary duct 36 and into Zones 6, 4a, and 4b. Preferably, the airflow directed into Zones 6, 4A, and 4B are arranged directly along rail 22.

The exhaust system 32 is arranged generally perpendicular to the first and second secondary ducts 36,38. That is, generally along the length of the system 20. The exhaust system 32 includes a plurality of exhaust ports 44. The exhaust ports 44 feed into the exhaust system 32 such that the HAPs are directed to an oxidizer (illustrated schematically at 46).

An exhaust port 44 is located in Zone 1, 2a, 2b, 7, and between Zones 5a and 6.

Preferably, the exhaust port in Zones 1, 2a and 2b are located opposite the robot position such that spraying operations are sprayed toward the exhaust ports 44. Airflow a is therefore constantly flowing from the blower ports 40, 42 to the exhaust ports 44. Preferably, balancing dampers 48 are located within the induction system 30 and the exhaust system 32 such that airflow is substantially maintained. The balance of airflow provides a substantially constant low flow high concentration of HAPs to an oxidizer 46.

Figures 6, 7:
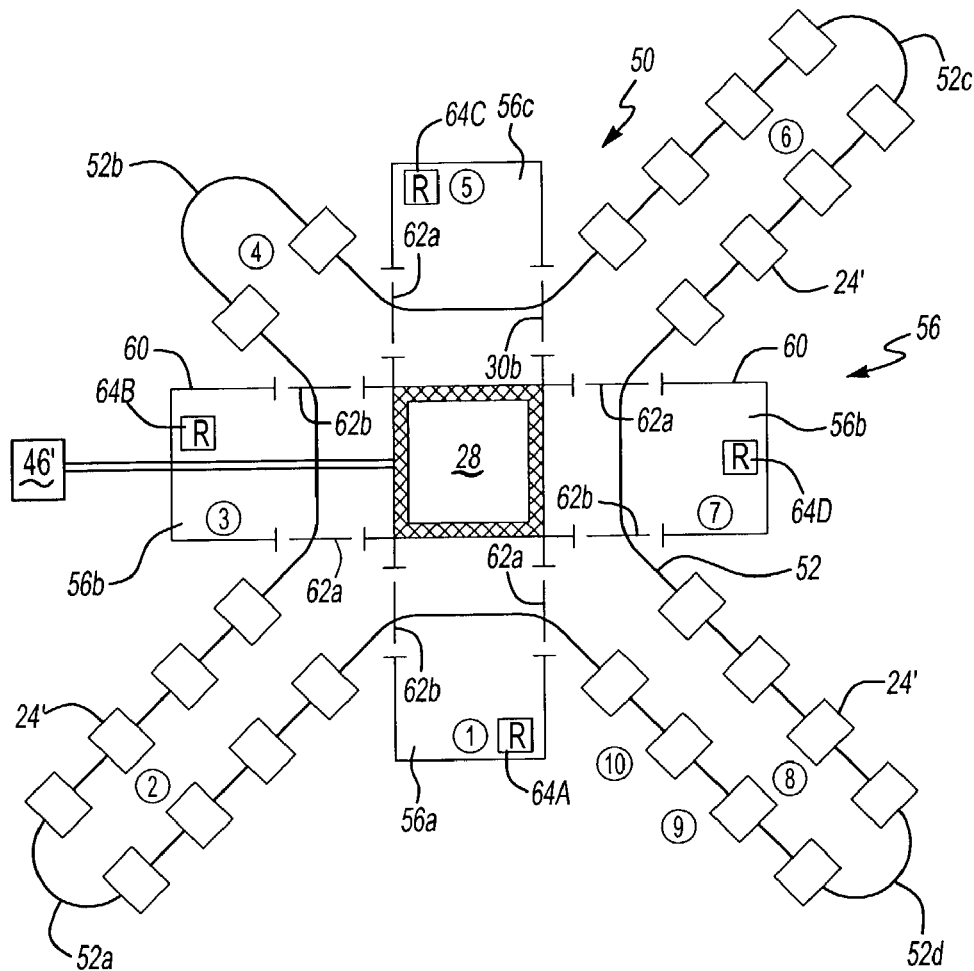
FIG. 6 is a general floor plan view of another mold manufacturing system designed according to the present invention.
FIG. 7 is a chart diagramming operation of the mold manufacturing system.

FIG. 6 illustrates another factory layout for a mold manufacturing system 50 according to the present invention. The system 50 includes a circuit 52 upon which a multiple of molds 24' transit a closed loop. The molds 24' preferably hang from an overhead rail system such that access is readily provided to the entire mold outer surface. Other transit systems such as conveyors, tracks, guided vehicles and the like will also benefit from the present invention.

The circuit 52 preferably defines an elongated cross like circuit in which the molds 24' move toward a spray booth 56, through the spray booth 56 and away from the spray booth 56 a multiple of times. In other words, the spray booth is a hub and the rail circuit is a closed circuit of radially extending spokes. Spraying occurs within the booth 56 a multiple of times during a single lap. All spray operations occur within the central spray booth 56. The booth 56 surrounds a common exhaust plenum 28. The common exhaust plenum 28 feed into and exhaust system (illustrated schematically at 59) such that the HAPs and VOCs are directed to the oxidizer (illustrated schematically at 46').

The system 50 is separated into Zones in which a particular mold operation is performed. Walls 60 or the like define and separate the spray booth 56 into spray zones defined as Zones 1, 3, 5 and 7 in which environmentally controlled applying operations are performed. As four spray Zones are provided in the illustrated embodiment, the booth 56 defines a substantially cross-shaped booth, however, other shapes will also benefit from the present invention. Each spray operation is performed in separate booth areas 56a, 56b, 56c and 56d yet all utilize the common exhaust plenum 58.

Concentrated spraying occurs in Zones 1, 3, 5, and 7. The high concentration of spraying and the associated low airflow requirements provides for more effective utilization of expensive environmental emission control devices. Moreover, as the spray Zones utilize the common exhaust plenum 58, a large number of spray operations (higher airflow lower spraying concentration) along a conventional assembly line type molding system are replaced by centralized booth 56 having low airflow and high spraying concentrations. Application of exceedingly expensive environmental emission control devices is therefore at least partially mitigated by the centralized spray booth 56 in which the low airflow requirements effectively remove the emissions and provide a much smaller factory footprint.

Preferably, each booth area 56a, 56b, 56c and 56d includes a separate entry door 62a and exit door 62b through which the circuit 52 passes. It should be understood that various well-known closures will benefit from the present invention. From the exit door 62b of one spray Zone to the entry door 62a of the next spray Zone, the molds 24' traverse one or more mold operations. A cure operation (Zone 2, 4, 6 and 8) occurs between each spray Zone 1, 3, 5 and 7. Most preferably, the radial length of each rail circuit leg 52a, 52b, 52c, and 52d away from the common exhaust plenum 28 is related to the time required to perform the required operations before the next spray operation (FIG. 7).

Zone 1 is an environmentally controlled applying operation in which the mold 24' is sprayed with a layer of resin referred herein as "gelcoat". The gelcoat, as generally known, is a hardenable resin that becomes the visible surface of the finished product.

Zone 1 includes a spray robot (illustrated schematically at 64A) which sprays toward the central exhaust plenum 58. Zone 3 provides for a relatively light barrier coat spray operation in combination with mold manipulation to provide for effective gravity-assisted spraying operations. Zone 3 also provide a concentrated spray in which the mold 24' or portions thereof are sprayed with a first layer of resin/catalyst/chopped fiberglass mixture referred herein as "chop" by a spray robot 64B. Zone 5 is a spray Zone in which the mold 24' is sprayed with a second layer of the resin/catalyst/chopped fiberglass mixture referred herein as "one chop" by a spray robot 64C. Zone 7 is a final spray Zone in which the mold 24' is sprayed with a foam support matrix and a cover coat by a spray robot 64D.

It should be understood that although a single robot is described in each of Zones 1,3,5 and 7, multiple robots will benefit from the present invention. It should further be understood that although robots are preferred for Zones 1, 3, 5 and 7, operators in proper protective equipment may additionally or alternatively be located in the spray Zones. In addition, the consolidation of spray operations minimizes the requirement for more highly skilled labor to the spray Zones or the required number of robots.

Zones 2, 4, 6, 8, 9, and 10 are mold operations which require minimal or low-concentration spraying and relatively uncomplicated manual tasks. It should be understood that the molds may transit the circuit 52, inside and outside booth 56a, 56b, 56c, 56d, at a relatively slow pace such that time is provided to perform various operations. Alternatively, or in addition, the molds may increment at a relatively quick pace then stop such that time is provided to perform various operations. Various transit methods will benefit from the present invention.

Zone 9 is where a completed part is removed or "pulled" from the mold 24', i.e., demolded. Zones 9–10 are where the bare mold is wiped down and cleaned after demolding. It should be understood that these operations may be performed by robots and/or human workers. Moreover, these Zones may incorporate both automated and human performed operations.

Zone 10 provides for continued wiping of the mold prior to Zone 1. Zones 10 may also include a staging area for molds 24' such that damaged molds or the like may be changed out with other molds without delaying operation of the system 50.

Zones 2, 4, 6 and 8 are primarily queues in which the previous spray operations are cured. The system 50 footprint is further reduced, as the curing Zones 2, 4, 6, and 8 are peripherally located about the central spray booth 56.

Referring also to FIG. 7, the molds 24' preferably stop for 3 minutes in each spray Zone 1, 3, 5 and 7. All the molds will therefore increment along the circuit 52 every three minutes. The time required for cure after each spray operation therefore provides the length of the cure rooms and thus the length of each leg 52a, 52b, 52c, and 52d. For example only, the spray operation of Zone 3 requires only six minute of cure time prior to the next operation while the spray operation of Zone 5 requires twenty-four minute of cure time prior to the next operation. Zone 6 extends radially away from booth 56 approximately four times the distance of Zone 4. That is, Zone 4 includes two stops (6 minutes total) while Zone 6 includes 8 stops (24 minutes total). It should be understood that should other spray times are require, the system 20 will be accordingly proportioned.

As the environmentally controlled applying operations are concentrated to but a few areas or a single area, the process airflow generated therefrom includes a substantially constant low flow with a high concentration of HAPs which maintain auto-fire for the oxidizer 46, 46' to provide more efficient and less expensive operation thereof.

Oxidation involves the high temperature destruction of an organic compound into the combustion byproducts carbon dioxide and water vapor. As generally known, simple thermal oxidation is most useful for controlling gas streams containing more than 100 ppmv of organic compounds. Thermal incineration can achieve 95% reductions in exhaust streams containing organic concentrations from 20 ppmv to 100 ppmv, and 99% reductions in streams containing organic from 100 ppmv on up. Catalytic incineration can achieve 90% reductions in streams containing organic concentrations from about 50 ppmv to 100 ppmv, and 95% reductions in streams with organic concentrations from 100 ppmv on up.

The performance of an oxidizer is commonly characterized by temperature, time and turbulence. Temperature—the oxidation reaction rate is accelerated at elevated temperatures. Higher temperatures cause faster oxidation rates and higher destruction efficiencies. Time—in order for the oxidation reaction to occur, the exhaust must remain at the reaction temperature for a minimum amount of time, called the "residence" or "retention" time. Greater destruction efficiencies result from longer residence times. The temperature and time are inversely proportional (although nonlinear) to each other in determining destruction efficiency. Turbulence—is required to ensure that the exhaust is well-mixed throughout the incineration chamber. Otherwise, a portion of the exhaust could pass through the chamber without adequate oxidation. Turbulence is not directly related to either temperature or time, but is a necessary condition for high destruction efficiency.

An oxidizer system may be characterized according to: Oxidation process—either "Thermal" or "Catalytic"; and Heat energy recovery method—either "Recuperative" or "Regenerative."

A recuperative thermal oxidizer uses a heat exchanger to transfer the thermal energy from the oxidizer exhaust to the inlet stream. The heat exchanger normally consists of relatively thin metallic surfaces that serve to physically separate the two flow streams, yet still efficiently transfer the heat energy. These thin metallic surfaces are prone to mechanical and thermal damage at elevated temperatures, so a recuperative oxidizer is usually limited to chamber temperatures less than 1,600° F.

A recuperative catalytic oxidizer combines the features of catalytic oxidation with recuperative heat recovery by incorporating a heat exchanger to transfer thermal energy from the oxidizer outlet stream to the inlet stream. The heat exchanger normally consists of relatively thin metallic surfaces that serve to physically separate the two flow streams yet still transfer the heat energy between the streams. These thin metallic surfaces are prone to mechanical and thermal damage at elevated temperatures, so a recuperative catalytic oxidizer is usually limited to chamber temperatures less than 1600° F.

A regenerative catalytic oxidizer (RCO) combines the features of catalytic oxidation with the benefits of regenerative heat recovery. An RCO is very similar to a typical RTO unit, except that small layer or a fine coating of catalyst is added to the thermal regeneration masses. The catalyst allows the peak oxidation temperature in the to be lowered without adversely affecting the destruction efficiency.

Preferably, the oxidizer 46, 46 of the present invention includes an RTO such as DURR-REECO® model R-25-V-295. It should be understood that other oxidizers other than an RTO such as a regenerative catalytic oxidizers, recuperative thermal oxidizers and recuperative catalytic oxidizers will also benefit from the present invention.

The majority of the heat energy produced by the oxidizer 46 is redirected for reuse in treating the process air stream containing HAPs and VOC's (volatile organic compounds) from process exhausts. It should be understood that the RTO itself forms no part of the present invention and multiple environmental systems, which heretofore required auxiliary fuel gas for operation, will benefit from the mold manufacturing systems of the present invention.

The mold manufacturing system 20, 50 provides a process airflow which includes a concentration of air pollutants which maintain auto-fire within the RTO. "Auto-fired" defined herein is utilized to describe operation of the oxidizer without usage of the heretofore requirement for auxiliary fuel gas such as natural gas which supplements the air pollutants to assure proper operational temperature for the RTO. The mold manufacturing systems 20, 50 typically generates a relatively high concentration of air pollutants over 300 ppmv.

The fuel content of the concentrated organic compounds contained in the exhaust stream provides all of the thermal energy needed to fire the oxidizer. For styrene vapor, the corresponding auto-fire concentration levels for the different types of oxidizer units are: 300–350 ppmv for a regenerative thermal oxidation; 1,200–1,400 ppmv for a recuperative catalytic oxidation; 1,800–2,100 ppmv for a recuperative thermal oxidation.

Auto-fired operation does not result in secondary emissions of additional $C_{O2}$, $S_{OX}$, or radon, because supplemental natural gas fuel is not consumed. Secondary CO and $N_{OX}$ emissions are still emitted due to the high temperatures in the combustion chamber.

It should be understood that auxiliary fuel gas may still be required during mold manufacturing system 20, 50 downtime such as between shifts, and breaks, however, when the mold manufacturing systems 20, 50 are operating no auxiliary fuel gas is required. The mold manufacturing systems 20, 50 are therefore self-sustaining when operating which increases efficiency and decreases cost.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A mold manufacturing system comprising:
    a closed circuit;
    a plurality of open molds that transit along said closed circuit;
    a plurality of Zones located along said closed circuit to perform a predetermined series of operations to each of said plurality of open molds, one of said plurality of Zones comprising an environmentally controlled applying operation which generates a process airflow, the predetermined series of operations including transiting the plurality of open molds through the environmentally controlled applying operation as a multiple of sets in which each set includes a reoccurring sequence of open molds in which each open mold within each set is on a different lap;
    an oxidizer; and
    an exhaust system which communicates said process airflow from said environmentally controlled applying operation to said oxidizer, said process airflow providing a concentration of air pollutants which maintains auto-fire within said oxidizer.

2. The mold manufacturing system as recited in claim 1, wherein said closed circuit passes though a booth a plurality of times.

3. The mold manufacturing system as recited in claim 1, wherein said plurality of open molds transit along said closed circuit for a plurality of laps such that said plurality of open molds pass through said environmentally controlled applying operation a plurality of times.

4. The mold manufacturing system as recited in claim 1, wherein said environmentally controlled applying operation comprises a spray operation.

5. The mold manufacturing system as recited in claim 1, wherein said process airflow contains a concentration of air pollutants between 300–400 parts per million.

6. The mold manufacturing system as recited in claim 1, wherein said process airflow contains a concentration of air pollutants between 300–350 parts per million.

7. The mold manufacturing system as recited in claim 1, wherein said process airflow contains a concentration of air pollutants of approximately 313 parts per million.

8. The mold manufacturing system as recited in claim 1, wherein said air pollutants comprise styrene.

9. The mold manufacturing system as recited in claim 1, wherein said wherein said process airflow contains a concentration of air pollutants between 300–400 parts per million, said air pollutants comprise styrene without auxiliary fuel gas.

10. A multi-lap mold manufacturing system comprising:
    a closed circuit;
    a plurality of open molds that transit about the closed circuit for a plurality of laps;
    a plurality of Zones located along said closed circuit to perform predetermined series of operations to each of said plurality of open molds relative to which lap each of the plurality of molds has completed, one of said plurality of Zones comprising an applying Zone located along said closed circuit to perform an environmentally controlled applying operation during each of said plurality of laps the predetermined series of operations including transiting the plurality of open molds through the environmentally controlled applying operation as multiple of sets in which each set includes a reoccurring sequence of open molds in which each open mold within each set is on a different lap;
    an oxidizer; and
    an exhaust system which communicates said process airflow from said applying Zone to said oxidizer, said process airflow providing a concentration of air pollutants which maintain auto-fire within said oxidizer.

11. The mold manufacturing system as recited in claim 10, wherein said air pollutants comprise styrene.

12. The mold manufacturing system as recited in claim 10, wherein said process airflow contains a concentration of air pollutants between 300–400 parts per million.

13. The mold manufacturing system as recited in claim 12, wherein said air pollutants comprise styrene.

14. A mold manufacturing system comprising:
- a central booth comprising a first and a second booth area about a common exhaust plenum;
- a closed circuit passing though said first and said second booth area;
- a plurality of open molds that transit along said closed circuit;
- a plurality of Zones located along said closed circuit to perform a predetermined series of operations to each of said plurality of open molds, a first Zone of said plurality of Zones comprising a first environmentally controlled applying operation performed within said first booth area and a second Zone of said plurality of Zones comprising a second environmentally controlled applying operation performed within said second booth area, said first and second environmentally controlled applying operation generating a process airflow into said common exhaust plenum, the predetermined series of operations including transiting the plurality of open molds through the first and second environmentally controlled applying operation as a multiple of sets in which each set includes a reoccurring sequence of open molds in which each open mold within each set is on a different lap;
- an oxidizer; and
- an exhaust system which communicates said process airflow from common exhaust plenum to said oxidizer, said process airflow providing a concentration of air pollutants which maintain auto-fire within said oxidizer.

15. The mold manufacturing system as recited in claim 14, wherein said closed circuit comprises a leg extending between an exit of said first booth area and an entry of said second booth area.

16. The mold manufacturing system as recited in claim 15, further comprising a curing queue along said leg.

* * * * *